(12) United States Patent
Rosenzweig et al.

(10) Patent No.: US 11,475,772 B2
(45) Date of Patent: Oct. 18, 2022

(54) SYSTEM AND METHOD FOR REMOTE OPERATOR ASSISTED DRIVING THROUGH COLLISION WARNING

(71) Applicant: OTTOPIA TECHNOLOGIES LTD, Tel Aviv (IL)

(72) Inventors: Amit Rosenzweig, Tel Aviv-Jaffa (IL); Shira Rotem, Tel Aviv (IL); Ori Gold, Tel-Aviv (IL)

(73) Assignee: Ottopia Technologies Ltd., Tel Aviv (IL)

( * ) Notice: Subject to any disclaimer, the term of this patent is extended or adjusted under 35 U.S.C. 154(b) by 256 days.

(21) Appl. No.: 16/864,617

(22) Filed: May 1, 2020

(65) Prior Publication Data
US 2020/0349844 A1    Nov. 5, 2020

Related U.S. Application Data

(60) Provisional application No. 62/841,267, filed on May 1, 2019.

(51) Int. Cl.
| | |
|---|---|
| *G08G 1/16* | (2006.01) |
| *G01C 21/34* | (2006.01) |
| *G01S 13/931* | (2020.01) |
| *G06T 11/60* | (2006.01) |

(52) U.S. Cl.
CPC ......... *G08G 1/166* (2013.01); *G01C 21/3415* (2013.01); *G01S 13/931* (2013.01); *G06T 11/60* (2013.01)

(58) Field of Classification Search
CPC .. G08G 1/166; G01C 21/3415; G01S 13/931; G01S 17/931; G01S 15/931; G01S 2013/9323; G01S 2013/9324; G01S 13/867; G06T 11/60; B60R 2300/301; B60R 2300/302; B60R 2300/304; B60R 1/00
See application file for complete search history.

(56) References Cited

U.S. PATENT DOCUMENTS

| | | | | |
|---|---|---|---|---|
| 7,660,725 | B2 * | 2/2010 | Wahlbin | G06Q 40/08 705/2 |
| 9,569,967 | B2 * | 2/2017 | Petridis | B60W 30/06 |
| 2006/0293856 | A1 * | 12/2006 | Foessel | G01S 13/931 701/301 |
| 2013/0321629 | A1 * | 12/2013 | Zhang | G06T 7/80 348/148 |
| 2015/0215625 | A1 * | 7/2015 | Huang | H04L 67/1008 382/239 |
| 2016/0284218 | A1 * | 9/2016 | Ejiri | G08G 1/166 |

(Continued)

*Primary Examiner* — Vivek D Koppikar
*Assistant Examiner* — Dominick Mulder
(74) *Attorney, Agent, or Firm* — M&B IP Analysts, LLC

(57) ABSTRACT

A system and method for collision warning. The method includes calculating a dynamic trajectory of a vehicle, the vehicle including at least one camera for capturing visual multimedia content, wherein the dynamic trajectory indicates a projected movement path of the vehicle, wherein the dynamic trajectory is calculated based on a respective stopping distance and a radius of movement determined for the vehicle; generating an overlay based on the at least one dynamic trajectory, wherein the overlay indicates at least one risk, wherein each of the at least one risk is located within the at least one dynamic trajectory; and applying the overlay to the visual multimedia content.

16 Claims, 9 Drawing Sheets

(56) References Cited

U.S. PATENT DOCUMENTS

2020/0302657 A1* 9/2020 Shimazu ............... G06T 11/001
2020/0324761 A1* 10/2020 Magzimof ............ B60W 30/09
2021/0016793 A1* 1/2021 Yamaguchi .......... G08G 1/0962

* cited by examiner

SYSTEM AND METHOD FOR REMOTE OPERATOR ASSISTED DRIVING THROUGH COLLISION WARNING

CROSS-REFERENCE TO RELATED APPLICATIONS

This application claims the benefit of U.S. Provisional Application No. 62/841,267 filed on May 1, 2019, the contents of which are hereby incorporated by reference.

TECHNICAL FIELD

The present disclosure relates generally to assisted driving, and more specifically to collision avoidance.

BACKGROUND

During normal operation, autonomous vehicles may encounter situations that they are not configured to handle properly. Existing autonomous driving solutions are not mature enough to be able to properly handle all of the various edge cases that occur on the road, particularly in complex environments such as city centers, business districts, enterprise campuses, and the like. Some particular examples of edge cases that are difficult for existing solutions to handle include following instructions from police officers guiding traffic, navigating around construction sites, navigating in areas lacking high definition map data, navigating in areas with inaccurate map data, mismatches between posted speed limits and actual speeds of typical drivers, maneuvering in parking lots with many parked cars, determining whether an obstacle in the road can be safely driven over (e.g., a fallen tree branch which would not affect the vehicle), and the like.

In order to handle these edge cases, some existing solutions utilize a remote human operator situated in a control center. A bi-directional communication link is established between the vehicle and a computing device operated by the remote human operator. Through this bi-directional communication link, the remote human operator receives video and other sensory data related to the vehicle's surroundings (e.g., data from internal and external cameras, Light Detection and Ranging [LiDAR] sensors, ultrasonic sensors, odometry sensors, etc.). The remote human operator provides inputs to the vehicle instructing the vehicle to perform actions to avoid risks.

Further, some existing solutions provide passive warning systems to aid the human operator. For example, lane-keeping warning systems alert the operator of unintended lane departures and forward collision warning systems indicate when, based on the current driving decisions, a collision is likely imminent. In such passive warning systems, the operator needs to actually make the driving decisions to return to their lane or avoid the risk of collision.

In contrast to passive warning systems, active safety systems take action when a risk is imminent. For example, forward collision warning systems identify imminent collisions and brake without any intervention by a human operator. Likewise, collision avoidance for intersection systems identify when another vehicle is approaching the intersection that will not allow for safe entrance and brakes in order to prevent the operator from causing the vehicle to enter the intersection.

In existing advanced driver assistance systems, the human operator is typically given priority over the passive warning systems or active safety systems. For example, the human operator may ignore the passive warnings or override the driving decisions of the active safety systems based on a misunderstanding of the risks around the vehicle.

Although remote human operators allow for handling edge cases that existing solutions cannot handle, use of human operators introduces new possibilities of human error. Human operators may be affected by disadvantages such as fatigue, distraction, and the like. Further, when remote operators switch between multiple vehicles in a short time period, they may become disoriented and mix up vehicle circumstances.

Additionally, when latency is high, communications between the remote human operator and the vehicle may be delayed and, therefore, prevent the human operator from relaying instructions quickly enough to avoid an accident.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for collision warning. The method comprises: calculating a dynamic trajectory of a vehicle, the vehicle including at least one camera for capturing visual multimedia content, wherein the dynamic trajectory indicates a projected movement path of the vehicle, wherein the dynamic trajectory is calculated based on a respective stopping distance and a radius of movement determined for the vehicle; generating an overlay based on the at least one dynamic trajectory, wherein the overlay indicates at least one risk, wherein each of the at least one risk is located within the at least one dynamic trajectory; and applying the overlay to the visual multimedia content.

Certain embodiments disclosed herein also include a non-transitory computer readable medium having stored thereon instructions for causing a processing circuitry to execute a process, the process comprising: calculating a dynamic trajectory of a vehicle, the vehicle including at least one camera for capturing visual multimedia content, wherein the dynamic trajectory indicates a projected movement path of the vehicle, wherein the dynamic trajectory is calculated based on a respective stopping distance and a radius of movement determined for the vehicle; generating an overlay based on the at least one dynamic trajectory, wherein the overlay indicates at least one risk, wherein each of the at least one risk is located within the at least one dynamic trajectory; and applying the overlay to the visual multimedia content.

Certain embodiments disclosed herein also include a system for collision warning. The system comprises: a processing circuitry; and a memory, the memory containing instructions that, when executed by the processing circuitry, configure the system to: calculate a dynamic trajectory of a vehicle, the vehicle including at least one camera for capturing visual multimedia content, wherein the dynamic trajectory indicates a projected movement path of the vehicle, wherein the dynamic trajectory is calculated based on a respective stopping distance and a radius of movement determined for the vehicle; generate an overlay based on the at least one dynamic trajectory, wherein the overlay indicates at least one risk, wherein each of the at least one risk is located within the at least one dynamic trajectory; and apply the overlay to the visual multimedia content.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
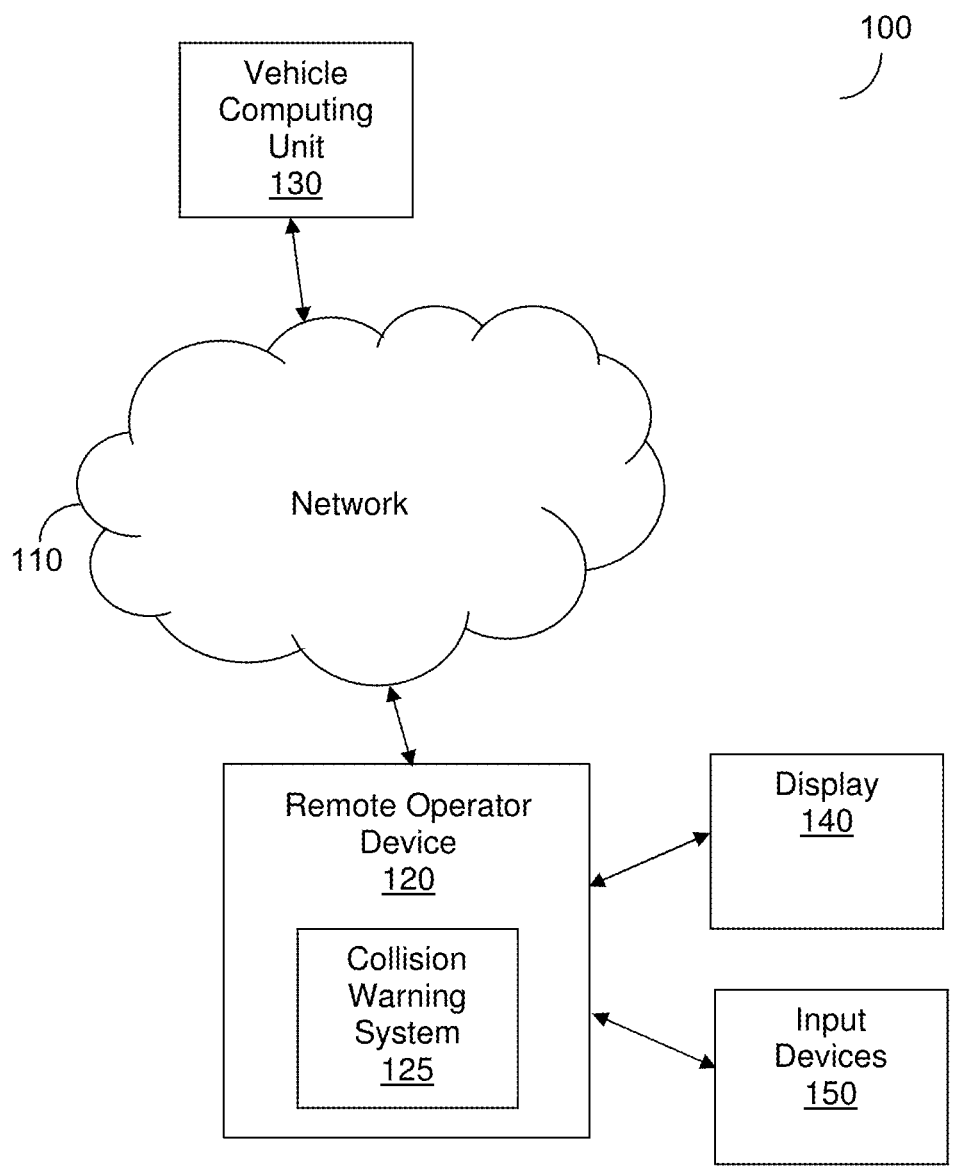
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Due to the issues with remote human operators noted above, it has been identified that the optimal approach to teleoperation of a vehicle would be to allow remote human operators to make driving decisions while prioritizing driving decisions of an automated collision warning system when there is a conflict between the human operator and the automated collision warning system. To this end, the disclosed embodiments provide a collision warning system utilizing improved collision warning techniques that account for latency and operator reaction time in order to improve accuracy of visual displays provided to remote operators and, therefore, improve accuracy of remote operators' driving decisions to avoid collisions.

In an embodiment, one or more dynamic trajectories of a vehicle are calculated based on sensor readings from sensors deployed with the vehicle. Each dynamic trajectory is a three-dimensional visualization of a future movement path that the vehicle is about to take. Based on the dynamic trajectories and any risk locations identified by a vehicle computing unit of the vehicle, one or more risks within the dynamic trajectory are determined. The dynamic trajectory is converted into a two-dimensional representation. An overlay indicating the dynamic trajectory and any risks within the dynamic trajectory is created and displayed to the operator over visual multimedia content captured by cameras of the vehicle.

FIG. 1 shows an example network diagram 100 utilized to describe the various disclosed embodiments. In the example network diagram 100, a remote operator device 120 and a vehicle computing unit 130 are communicatively connected via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

The remote operator device 120 may be, but is not limited to, a personal computer, a laptop, a tablet computer, a smartphone, a wearable computing device, or any other device capable of receiving inputs and displaying feedback information. The remote operator device 120 is configured to perform collision warning as described herein. To this end, the remote operator device 120 includes a collision warning system 125. The collision warning system 125 may be a logical subcomponent of the remote operator device 120 or may be a hardware component of the remote operator device 120.

The vehicle computing unit 130 is installed in a vehicle and is configured to perform autonomous driving for the vehicle. The vehicle computing unit 130 may be further configured to perform collision avoidance activities.

The remote operator device 120 is further communicatively connected to a display 140 and one or more input devices 150. The display 140 is configured to display collision warning data generated by the collision warning system 125 to an operator of the vehicle. The input devices 150 are configured to receive inputs from the operator which can be utilized to control the vehicle and may include, but are not limited to, brakes, pedals, a mouse, a keyboard, touch screens, combinations thereof, and the like.

Figure 2:
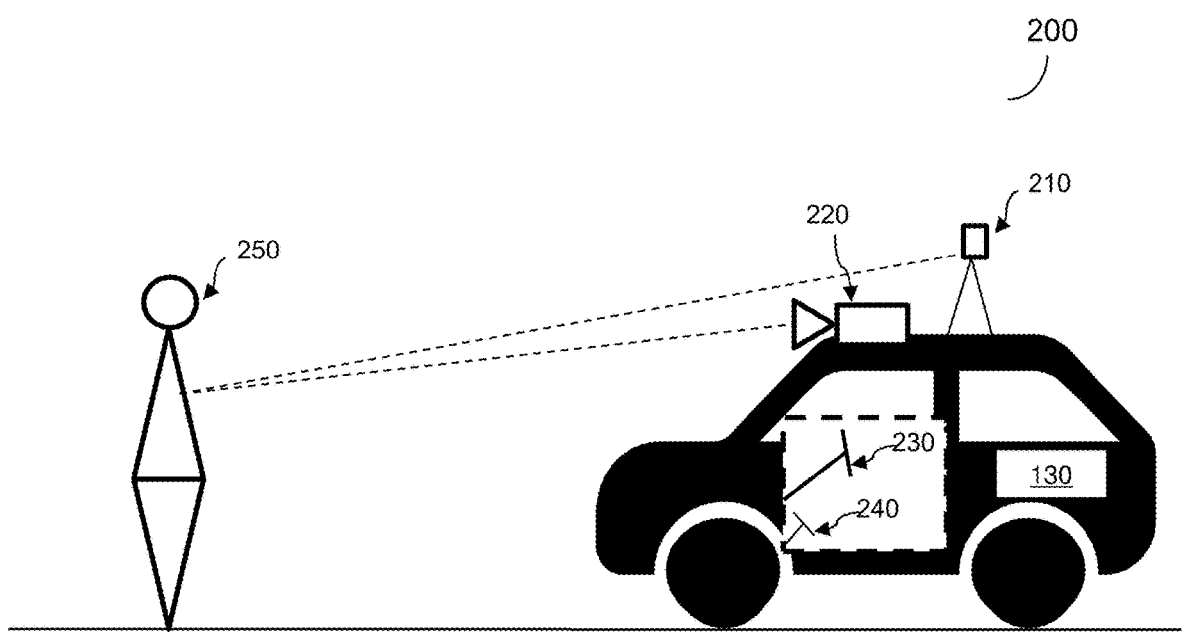
FIG. 2 is a vehicle components diagram utilized to describe various disclosed embodiments.

FIG. 2 is an example vehicle components diagram 200 utilized to describe various disclosed embodiments. The vehicle components diagram 200 illustrates an example vehicle environment relevant to the disclosed embodiments.

The vehicle components diagram 200 includes the vehicle computing unit 130, one or more sensors 210, a teleoperation camera 220, a vehicle steering wheel 230, vehicle pedals 240, and an obstacle 250.

The vehicle computing unit 130 is configured to control the vehicle based on driving decision inputs received from the remote operator device 120. To this end, the vehicle computing unit 130 collects video or a combination of images and video via the teleoperation camera 220 as well as other sensory signals captured by the sensors 210. The sensors 210 provide sensory signals that may be relevant to the remote operator's driving decisions, to autonomous driving decisions, or both. The sensors 210 may be, but are not limited to, Radar sensors, Light Detection and Ranging [LiDAR] sensors, ultrasonic sensors, odometry sensors, combinations thereof, and the like.

The vehicle computing unit 130 is configured to control the vehicle steering wheel 230 and the vehicle pedals 240 in order to control the vehicle and to navigate. In an embodiment, when the vehicle approaches an obstacle such as the obstacle 250 (e.g., as determined based on readings from the sensors 210 and the teleoperation camera 220), the vehicle computing unit 130 is configured to prompt a remote human operator of the remote operator device 120 for inputs indicating driving decisions for navigating around the obstacle.

In some implementations, the vehicle computing unit 130 may be configured to calculate a dynamic trajectory of a vehicle as described herein. This may be performed in parallel to the calculation of the dynamic trajectory of the vehicle by the remote operator device 120. Calculating the dynamic trajectory of the vehicle both on the vehicle side and on the operator side provides redundant calculation of dynamic trajectory, which ensures that collision avoidance activities may be successfully performed even when communications between the vehicle computing unit 130 and the remote operator device 120 are disrupted.

If, as described herein, the vehicle computing unit 130 determines that a risk is within a dynamic trajectory representing a future path of the vehicle's movement, the vehicle computing unit 130 is configured to send data indicating those risks to the remote operator device 120 for use in collision warning as described herein. Determining when to override driving decisions by the operator and taking collision avoidance actions is described further below with respect to FIG. 4 and in U.S. patent application Ser. No. 16/860,868, assigned to the common assignee, the contents of which are hereby incorporated by reference.

Figure 3:
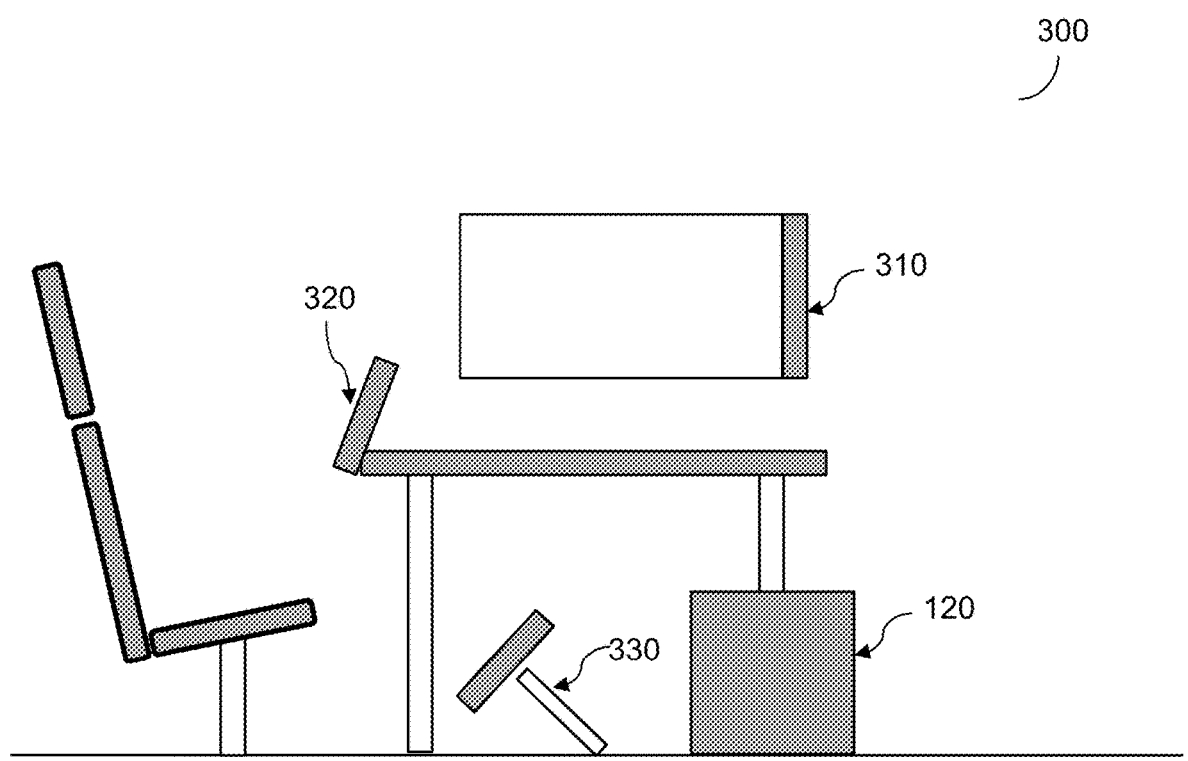
FIG. 3 is an operator station components diagram utilized to describe various disclosed embodiments.

An example setup for a remote human operator providing inputs to the vehicle computing unit 130 is now described with respect to FIG. 3. FIG. 3 is an example operator station components diagram 300 utilized to describe various disclosed embodiments.

The operator station components diagram 300 includes the remote operator device 120, one or more operator screens 310, an operator control wheel 320, and operator control pedals 330. The remote operator device 120 is a computing device configured to receive data from the operator control wheel 320 and the operator control pedals 330 as well as to send inputs determined based on that data to the vehicle computing unit 130 (not shown in FIG. 3). The remote operator device 120 is further configured to provide visual displays of collision warning data as described herein.

The operator screens 310 are computer monitors or other displays capable of displaying information received from the vehicle computing unit 130. Such data includes, but is not limited to, feedback data, sensory data, visual data captured by cameras, combinations thereof and the like. In particular, the visual data includes video or other content demonstrating the environment surrounding the vehicle and, in particular, potential risks such as the obstacle 250.

The operator control wheel 320 and operator control pedals 330 are input devices configured to receive input data from a remote human operator (not shown) via interaction with the wheel 320 and pedals 330. The input data may be translated, by the remote operator device 120, into a format usable by the vehicle computing unit 130, or may be sent directly such that the vehicle computing unit 130 may determine driving actions to take based at least partially on that input data.

It should be noted that the diagrams shown in FIGS. 1-3 are merely examples utilized to convey the kinds of environments in which the disclosed embodiments operate, and that the disclosed embodiments are not limited to these particular environments and configurations. Other environments and configurations may be equally used without departing from the scope of the disclosure. As a particular example, a vehicle without conventional steering wheel or pedals may be controlled without departing from the scope of the disclosure.

Figure 4:
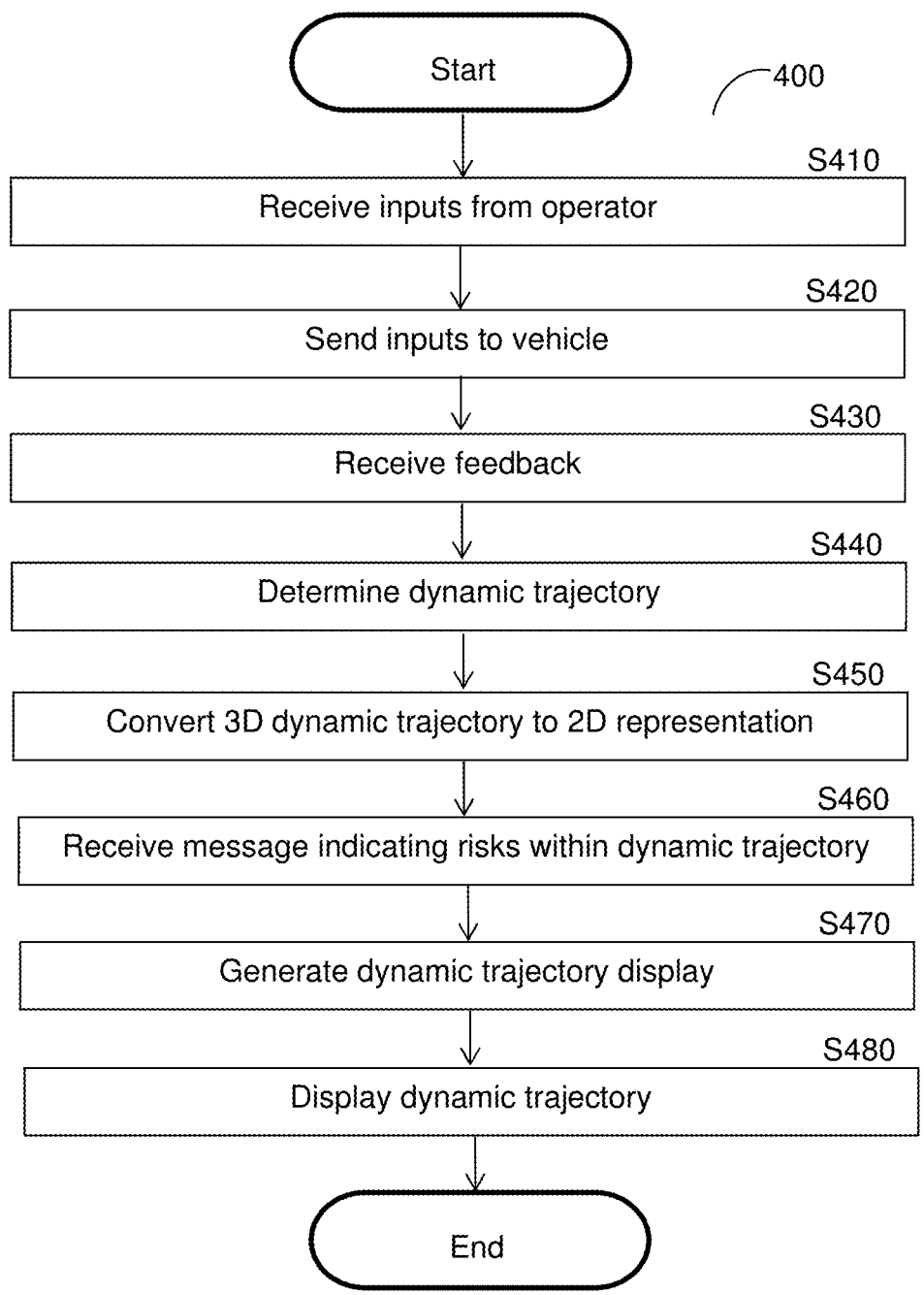
FIG. 4 is a flowchart illustrating a method for driving assistance with collision warning according to an embodiment.

FIG. 4 is a flowchart 400 illustrating a method for driving assistance with collision warning according to an embodiment. In an embodiment, the method is performed by the remote operator device 120, FIG. 1.

At S410, inputs are received from an operator of a vehicle. The inputs may be, or may be based on, pedal and wheel position data obtained via one or more input devices used by the operator (e.g., via the operator control wheel 320 and pedals 330, FIG. 3).

At S420, the inputs are sent to a vehicle in order to allow a vehicle computing unit to control the vehicle based on the operator's driving decisions.

At S430, feedback is received. The feedback indicates the current positions of the wheel and pedal of the vehicle and may be provided as, for example, information to be displayed to the operator, changes in orientation or position of a wheel and pedals used by the operator, a combination thereof, and the like.

At S440, one or more dynamic trajectories of the vehicle are determined. Each dynamic trajectory is a projected future movement of the vehicle based on the inputs received from the operator. Thus, a dynamic trajectory represents the path that the vehicle would take if it were to navigate based on the operator's inputs. Accordingly, if there is a risk within the dynamic trajectory, it may be concluded that the operator should be overridden in order to avoid the risk. Thus, the dynamic trajectory acts as a safety buffer for risk avoidance.

In an embodiment, determining the dynamic trajectory includes calculating the stopping distance of the vehicle. In a further embodiment, the dynamic trajectory is only calculated when the feedback data has changed since feedback data was last received. That is, in such an embodiment, the feedback data received at S430 may be compared to the most recent previous feedback data in order to determine if, for example, the positions of the steering wheel and pedals of the vehicle have changed since the last feedback. Otherwise, the most recent calculated dynamic trajectory is used and the dynamic trajectory does not need to be re-calculated until such a change occurs.

In an embodiment, two dynamic trajectories are determined based on stopping distances that accommodate for latency and for latency plus reaction times, respectively. In this regard, it is noted that latency may cause time delays in receiving data from ($t_1$) and sending data to ($t_2$) the vehicle. For example, assuming that $t_1$ and $t_2$ have an average total time of 300 milliseconds when the vehicle is traveling at a speed of 30 kilometers/hour, the latency could result in up to a 2.5 meter difference between the intended or otherwise needed stopping distance of the vehicle and the actual stopping distance of the vehicle. Likewise, the reaction time of the operator should be taken into account in order to make collision warnings that more accurately reflect the required actions by the operator.

To this end, in a further embodiment, the stopping distances may be calculated using the following equations:

$$d_{s1} = (v \times t_1) + (v \times t_0) + \frac{a^2}{2} + \frac{v^2}{2 \times (df)} \quad \text{Equation 1}$$

Equation 1 is used to calculate the first stopping distance. In Equation 1, $d_s$ is the stopping distance of the vehicle, v is the current velocity of the vehicle, $t_1$ is the incoming latency time (i.e., the amount of time it takes a single frame to reach the remote operator device when sent from the vehicle computing unit), $t_0$ is the reaction time of the vehicle's systems, a is the current acceleration, and df is a constant value that is predetermined based on required force standards for the braking system used by the vehicle that is selected to safely cover a wide range of surfaces. The stopping distance is the distance before the vehicle comes to a complete stop (i.e., velocity becomes zero).

$$d_{s2} = [(v \times t_1) + (v \times t_2) + (v \times r)] + (v \times t_0) + \frac{a^2}{2} + \frac{v^2}{2 \times (df)} \quad \text{Equation 2}$$

Equation 2 is used to calculate the second stopping distance. In Equation 2, $t_2$ is the outgoing latency time (i.e., the amount of time it takes a single frame to reach the vehicle computing unit when sent from the remote operator device) and r is the reaction time of the operator. The reaction time of the operator may be a predetermined value, and may be a default value (i.e., the same for all operators) or may be a value determined based on past reactions by the operator (e.g., as an average of previous reaction times of that operator).

The result of each of Equations 1 and 2 is a vector line representing the stopping distance in a three-dimensional (3D) environment. In an example implementation, two radii of movement of the vehicle are determined using the Ackermann model for steering geometry based on the results of Equations 1 and 2, respectively. Each radius and stopping distance are utilized to calculate an arc of movement representing the angular stopping distance of the vehicle. Each arc of movement is applied to two points from the center of the vehicle, where the points are located far enough apart to minimize the chance of collision. The result of applying the arc of movement to these two points is two wider arcs that collectively form the dynamic trajectory. Thus, two dynamic trajectories are calculated by applying arcs determined based on the results of Equations 1 and 2, respectively.

In this regard, it has been identified that, for a 1.8 meter wide vehicle, placing the first point of each arc at a position 1.25 meters away from the center of the vehicle puts the arcs at a 0.35 meter distance which, in turn, significantly reduces the chance of collision. Other distances may be equally utilized, particularly when the width of the vehicle varies.

Figure 5:
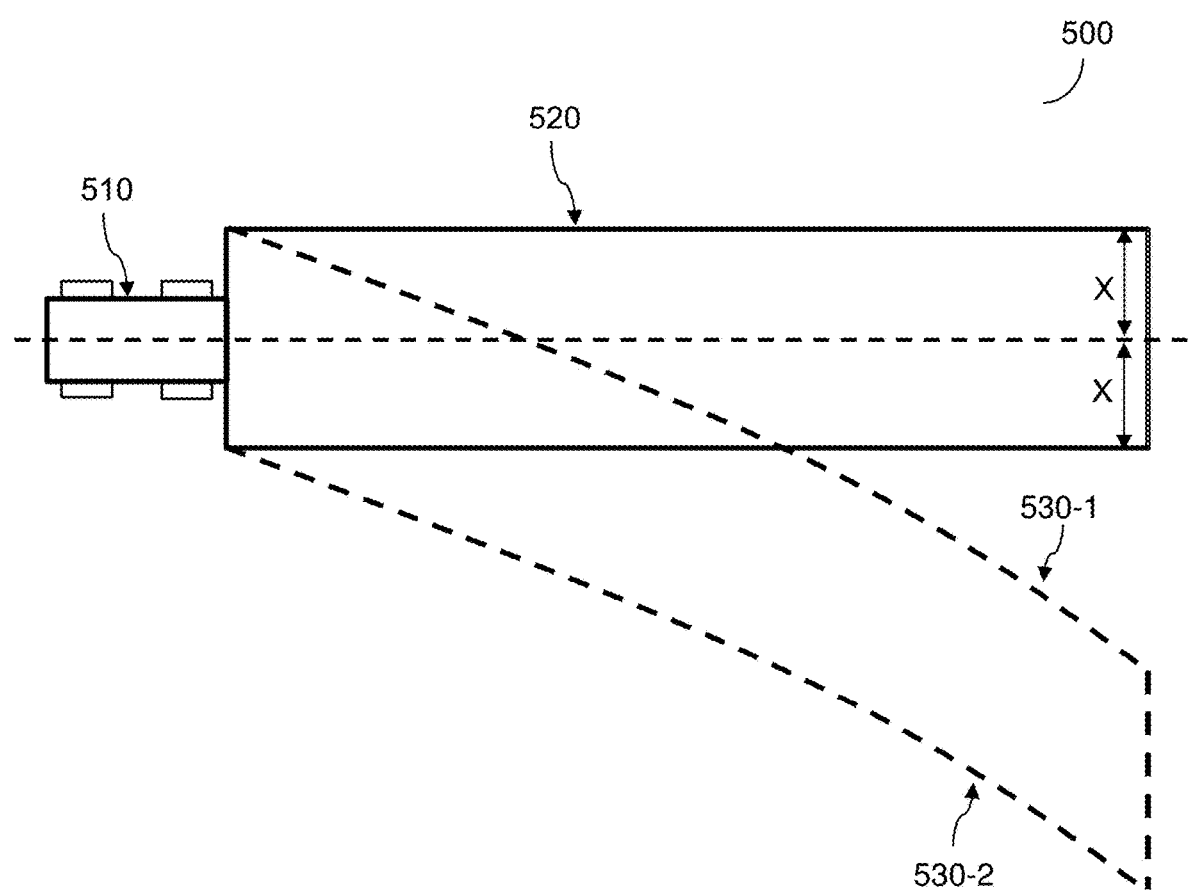
FIG. 5 is a trajectory diagram visually depicting a dynamic trajectory of a vehicle calculated in accordance with the disclosed embodiments.

An example angular stopping distance illustration used to demonstrate a dynamic trajectory is shown in FIG. 5. FIG. 5 is a trajectory diagram 500 visually depicting a dynamic trajectory of a vehicle calculated in accordance with the disclosed embodiments.

The trajectory diagram 500 shows a vehicle 510 following a current navigation path 520 with arcs 530-1 and 530-2 that collectively form the dynamic trajectory of the vehicle 510. Each arc 530 begins at a predetermined distance X from the center axis of the vehicle.

It should be noted that FIG. 5 depicts a dynamic trajectory from a top-down perspective that appears to be two dimensional but, in an embodiment, the dynamic trajectory is calculated in three-dimensional space. Thus, FIG. 5 only reflects two dimensions of such a calculation and is merely used for illustrative purposes.

Returning to FIG. 4, at S450, the 3D dynamic trajectory is converted into a two-dimensional (2D) representation. In an embodiment, the conversion may be performed using a projective geometry model. The projective geometry model uses a multiplication of extrinsic and intrinsic matrices and establishes the geometric relationship between points in the 3D world and corresponding positions in 2D images captured by cameras of the vehicle. Points from the dynamic trajectory are written in a 3D world point format (e.g., [x,y,z]) and then inserted into each matrix, thereby resulting in an image plane pixel position.

At S460, a message indicating risks within the dynamic trajectory is received. In an embodiment, the risk locations may be identified by the vehicle computing unit based on receiving sensor data collected by scanning the vehicle's environment for potential risks. The sensor data may be from a single sensor or from a fusion of multiple sensors.

Whether a risk is within the dynamic trajectory may be determined based on a dynamic trajectory computed by the vehicle computing unit based on a stopping distance determined using the following equation:

$$d_{s3} = (v \times t_0) + \frac{a^2}{2} + \frac{v^2}{2 \times (df)} \quad \text{Equation 3}$$

Once the stopping distance is computed by the vehicle computing unit as shown in Equation 3, the dynamic trajectory may be computed via application of arcs as described above. The risks identified by the vehicle computing unit may be mapped and the dynamic trajectory may be translated to the maps in order to determine any intersections as described further in U.S. patent application Ser. No. 16/860,868, assigned to the common assignee, the contents of which are hereby incorporated by reference. Further, as described in U.S. patent application Ser. No. 16/860,868, the risks may be mapped as risk trajectories determined based on classifications of the risks and their movement vectors. This allows for taking moving obstacles such as other vehicles or pedestrians into account. To this end, the received messages may include these maps, the risk dynamic trajectories, or otherwise may include data indicating risk locations of the risks within the dynamic trajectory.

Returning to FIG. 4, at S470, a dynamic trajectory overlay is generated. In an embodiment, S470 includes translating points of the two-dimensional representation of the dynamic trajectory into pixels that are laid on an operator screen (e.g., the screens 310, FIG. 3) displaying visual content captured by cameras of the vehicle.

In an embodiment, the dynamic trajectory overlay may be created based on a sampling of points in the 2D representation of the dynamic trajectory. In a further embodiment, in order to minimize calculation time, the number of sampled points is limited to a number of points that is independent of the length of the dynamic trajectory vector (e.g., a predetermined number of points). These sampled points are translated into pixels and laid on the screen with connecting curves to result in a smooth representation of the dynamic trajectory.

In an example implementation, when there is a risk within the dynamic trajectory, the pixels of the dynamic trajectory on the screen may be visually distinct from a default appearance (e.g., colored in a danger-associated color such as red) to indicate to the operator that danger is imminent and evasive action should be taken. When there is not a risk within the dynamic trajectory, the pixels of the dynamic trajectory may have a default appearance (e.g., depicted using a color not associated with danger such as green or grey) to indicate to the operator that there is no imminent risk and, therefore, the operator can drive normally. If the collision warning is combined with active collision avoidance, the display may further indicate the evasive actions automatically taken by the vehicle (e.g., that the vehicle is braking).

Figure 6A:
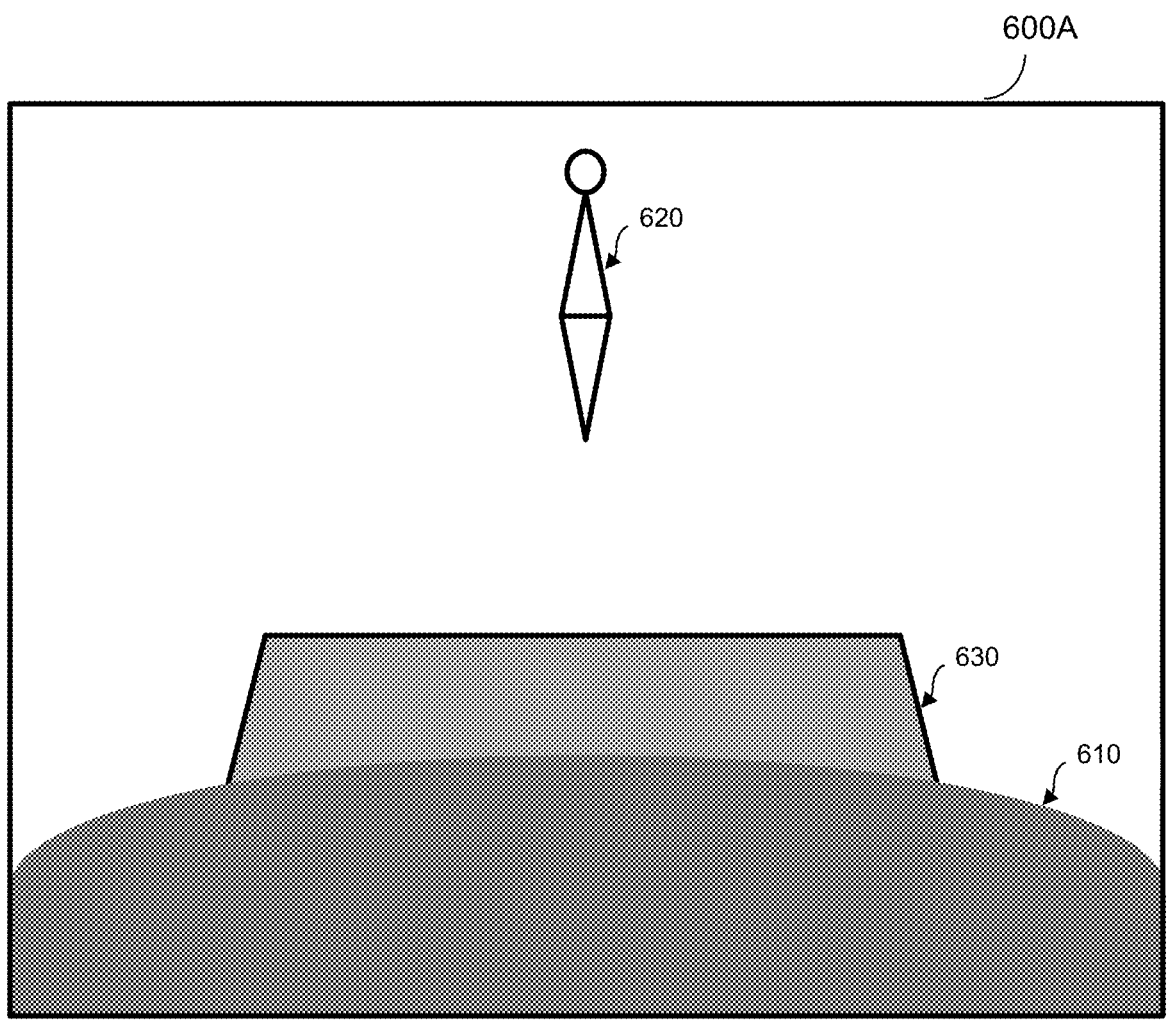
FIGS. 6A-C are illustrations of displays.
Figure 6B:
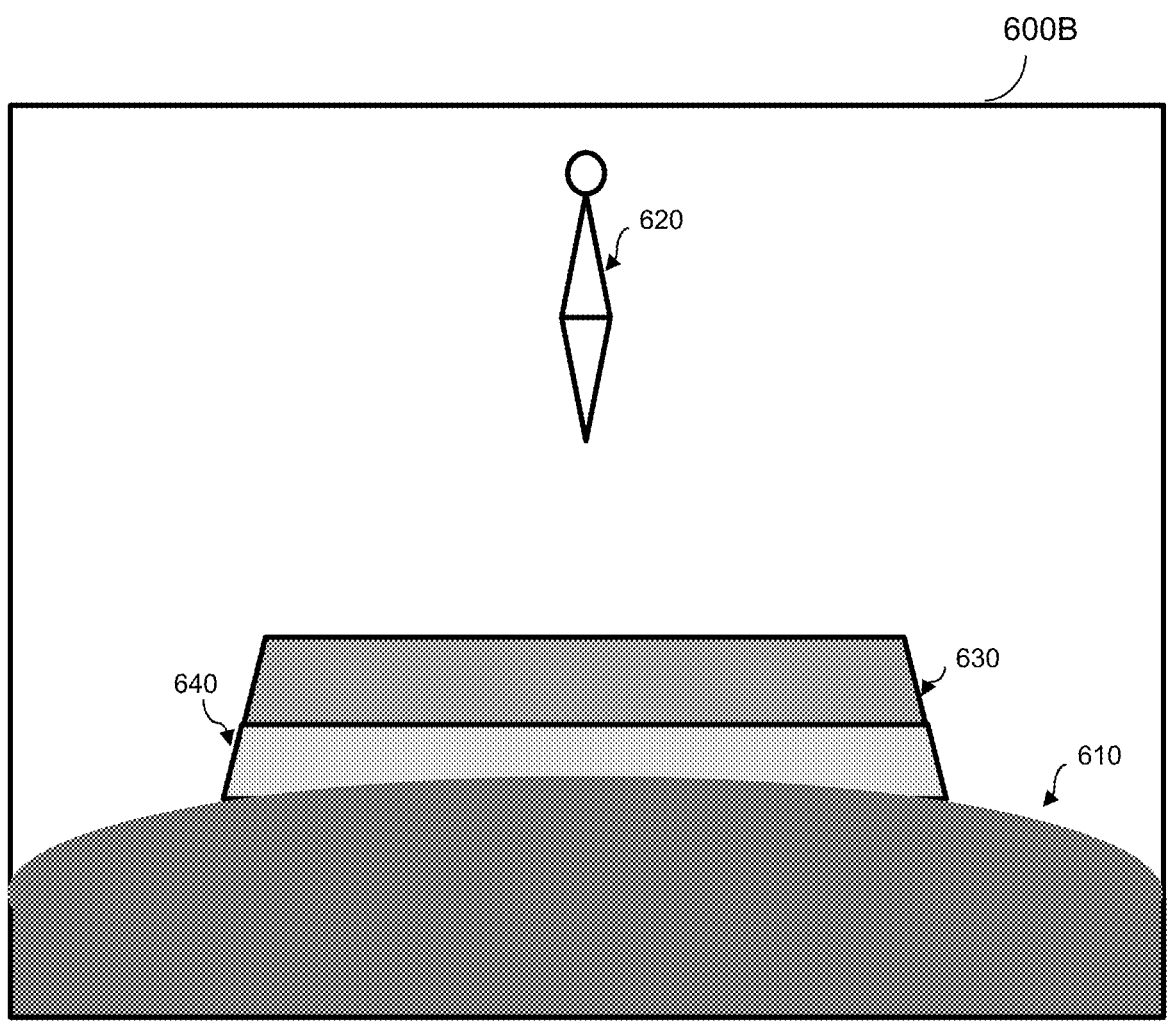
Figure 6C:
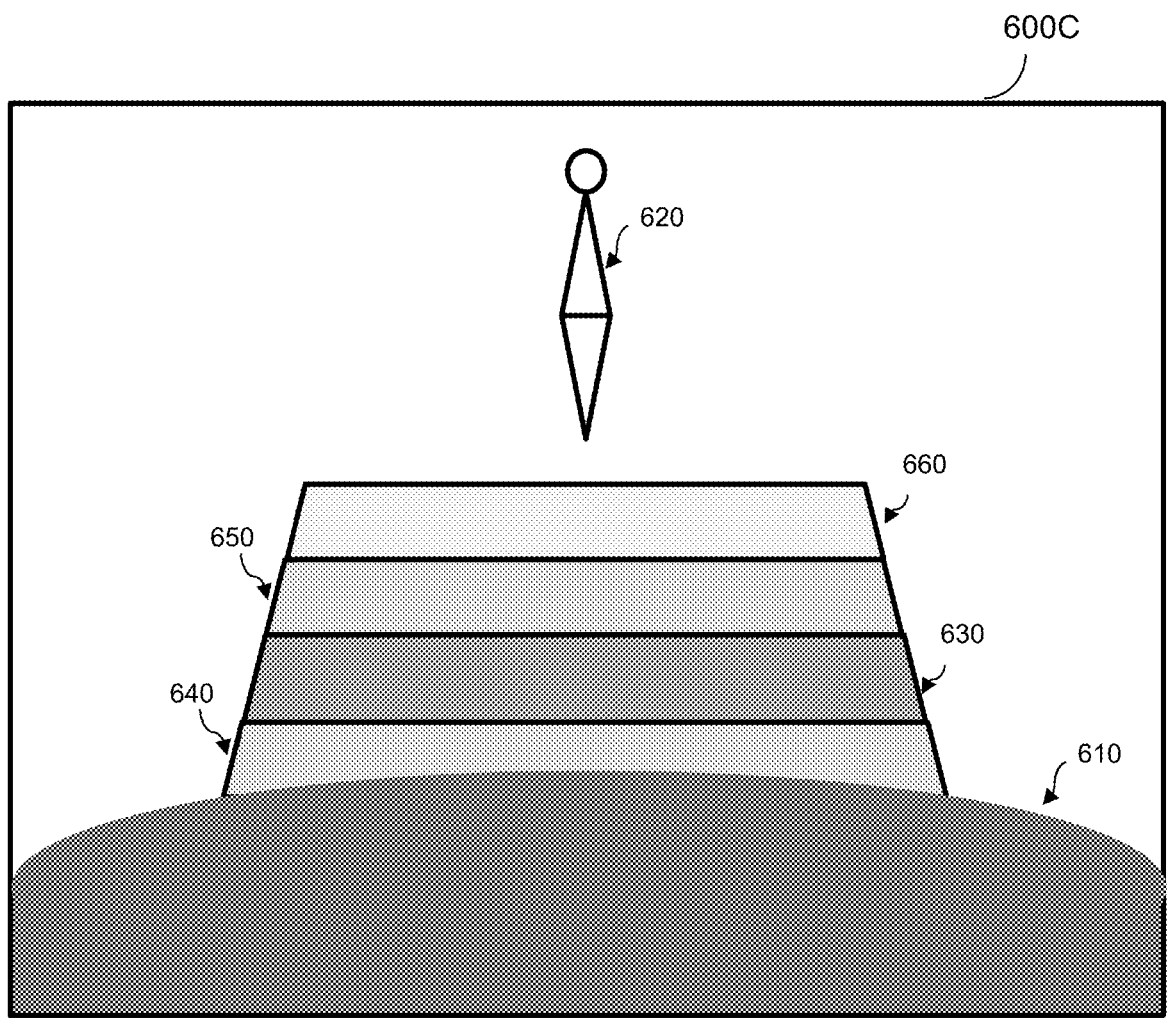

FIGS. 6A-C are example illustrations 600A-C of displays demonstrating the different dynamic trajectories described above with respect to Equations 1-3.

The illustration 600A shows the front end of the vehicle 610 approaching a pedestrian 620. The illustration 600A further shows a dynamic trajectory 630 calculated using a stopping distance determined using Equation 3. More specifically, the illustration 600A shows the dynamic trajectory projected by the vehicle computing unit without assuming any latency or reaction time. This dynamic trajectory is utilized by the vehicle computing unit to determine whether any risks are within the dynamic trajectory.

The illustration 600B shows a further projection 640 of the dynamic trajectory 630. The projection 640 represents the additional consideration given to incoming latency time (i.e., time to receive the data sent from the vehicle computing unit to the remote operator device). In other words, illustration 600B reflects the dynamic trajectory calculated based on the stopping distance of Equation 1.

The illustration 600C shows even further projections 650 and 660 of the dynamic trajectory 630. The projections 650 and 660 represent the additional considerations given to reaction time of the operator and outgoing latency time (i.e., time to send the data sent from the remote operator device to the vehicle computing unit), respectively.

Returning to FIG. 4, at S480, the dynamic trajectory is displayed via a display of the operator. In an embodiment, S480 includes applying the overlay to visual multimedia content captured by cameras of the vehicle.

Figure 7:
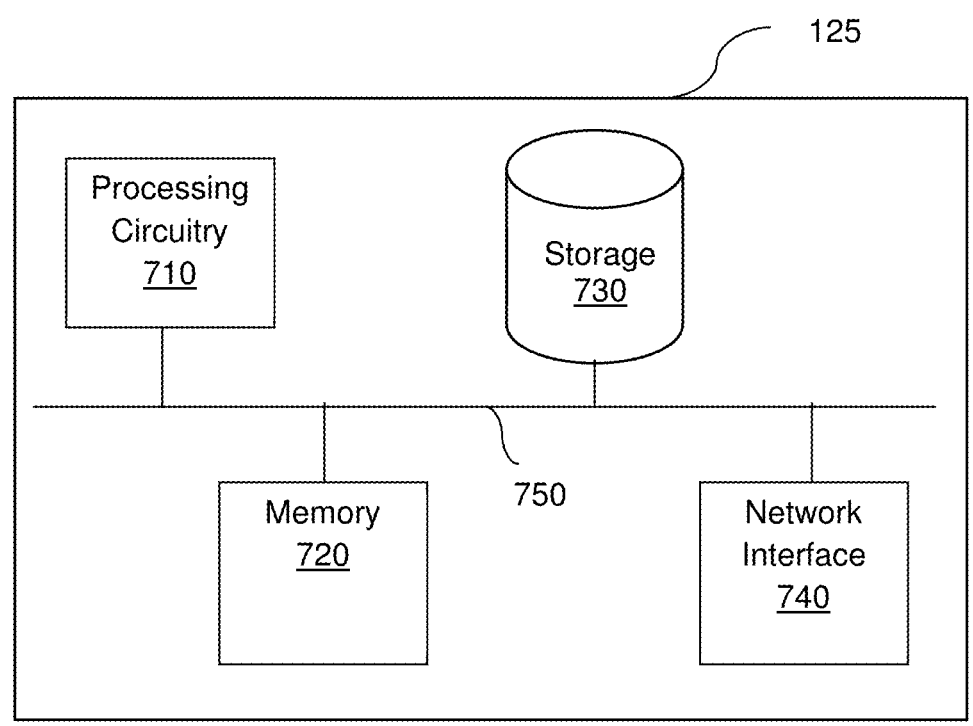
FIG. 7 is a schematic diagram of a remote operator device according to an embodiment.

FIG. 7 is an example schematic diagram of a remote operator device 120 according to an embodiment. The remote operator device 120 includes a processing circuitry 710 coupled to a memory 720, a storage 730, and a network interface 740. In an embodiment, the components of the remote operator device 120 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the remote operator device 120 to communicate with the vehicle computing unit 130 for the purpose of receiving sensor and risk data, sending driving decision inputs, and the like.

It should be understood that the embodiments described herein are not limited to the specific architecture illustrated in FIG. 7, and other architectures may be equally used without departing from the scope of the disclosed embodiments.

It should also be noted that the disclosed embodiments are generally described with respect to a remote operator, but that the disclosed embodiments may, at least in some implementations, be applicable to instances where the operator is in the vehicle, i.e., where the operator is not a remote operator.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for collision warning, comprising:
    calculating a first dynamic trajectory of a vehicle based on at least one first latency value, the vehicle including at least one camera for capturing visual multimedia content, wherein the first dynamic trajectory is calculated based on a respective first stopping distance and a first radius of movement determined for the vehicle, wherein the first dynamic trajectory is formed by applying a first arc of movement to each of two points located relative to a center of the vehicle, wherein the first arc of movement is calculated using the first stopping distance and the first radius of movement;
    calculating a second dynamic trajectory of the vehicle, based on at least one second latency value and at least one reaction time, wherein the second dynamic trajectory is calculated based on a second stopping distance and a second radius of movement determined for the vehicle, wherein the second dynamic trajectory is formed by applying a second arc of movement to each of the two points located relative to the center of the vehicle, wherein the second arc of movement is calculated using the second stopping distance and the second radius of movement, wherein each dynamic trajectory indicates a projected movement path of the vehicle;
    generating an overlay based on the first dynamic trajectory and the second dynamic trajectory, wherein the overlay indicates at least one risk, wherein each of the at least one risk is located within the first dynamic trajectory and the second dynamic trajectory; and
    applying the overlay to the visual multimedia content.

2. The method of claim 1, wherein the at least one first latency value includes an incoming latency time $t_1$, wherein the incoming latency time $t_1$ is an amount of time required to receive at least one frame at a remote operator device from a vehicle computing unit of the vehicle.

3. The method of claim 1, wherein the at least one first latency value includes an incoming latency time $t_1$ and an outgoing latency time $t_2$, wherein the incoming latency time $t_1$ is an amount of time required to receive at least one frame at a remote operator device from a vehicle computing unit of the vehicle, wherein the outgoing latency time $t_2$ is an amount of time required to send at least one frame from a remote operator device to a vehicle computing unit of the vehicle.

4. The method of claim 1, wherein each dynamic trajectory is a three-dimensional (3D) projection including a plurality of 3D points, further comprising:
    converting each dynamic trajectory into a two-dimensional (2D) representation using a projective geometry model, each 2D representation having a plurality of 2D points, wherein each 2D representation includes an image plane pixel position of each 2D point of the 2D representation.

5. The method of claim 4, wherein generating the overlay further comprises:
    translating at least a portion of the plurality of 2D points of each 2D representation into a plurality of pixels based on the image plane pixel position of each 2D point.

6. The method of claim 5, each dynamic trajectory having a length, wherein the at least a portion of the plurality of 2D points of each 2D representation includes a sampling of the plurality of 2D points, wherein the sampling includes a number of points that is independent of the length of the respective dynamic trajectory.

7. The method of claim 1, the vehicle having a front end and a center axis, wherein each dynamic trajectory includes two arcs, each arc representing a respective angular stopping distance of the vehicle, wherein each arc begins at a point along the front end of the vehicle, wherein the two arcs are located at a predetermined distance from the center axis of the vehicle.

8. A non-transitory computer readable medium having stored thereon instructions executed by a processing circuitry for causing the processing circuitry to execute a process, the process comprising:
    calculating a first dynamic trajectory of a vehicle, the vehicle including at least one camera for capturing visual multimedia content, wherein the first dynamic trajectory is calculated based on a first stopping distance and a first radius of movement determined for the vehicle, wherein the first dynamic trajectory is formed by applying a first arc of movement to each of two points located relative to a center of the vehicle, wherein the first arc of movement is calculated using the first stopping distance and the first radius of movement;
    calculating a second dynamic trajectory of the vehicle, wherein the second dynamic trajectory is calculated based on a second stopping distance and a second radius of movement determined for the vehicle, wherein the second dynamic trajectory is formed by applying a second arc of movement to each of the two points located relative to the center of the vehicle, wherein the second arc of movement is calculated using the second stopping distance and the second radius of movement, wherein each dynamic trajectory indicates a projected movement path of the vehicle;
    generating an overlay based on the first dynamic trajectory and the second dynamic trajectory, wherein the overlay indicates at least one risk, wherein each of the at least one risk is located within the first dynamic trajectory and the second dynamic trajectory; and
    applying the overlay to the visual multimedia content.

9. A system for collision warning, comprising:
    a processing circuitry; and
    a memory, the memory containing instructions that, when executed by the processing circuitry, configure the system to:
    calculate a first dynamic trajectory of a vehicle, the vehicle including at least one camera for capturing visual multimedia content, wherein the first dynamic trajectory is calculated based on a first stopping distance and a first radius of movement determined for the vehicle, wherein the first dynamic trajectory is formed by applying a first arc of movement to each of two points located relative to a center of the vehicle, wherein the first arc of movement is calculated using the first stopping distance and the first radius of movement;
    calculate a second dynamic trajectory of the vehicle, wherein the second dynamic trajectory is calculated based on a second stopping distance and a second radius of movement determined for the vehicle, wherein the second dynamic trajectory is formed by applying a second arc of movement to each of the two points located relative to the center of the vehicle, wherein the second arc of movement is calculated using the second stopping distance and the second radius of movement, wherein each dynamic trajectory indicates a projected movement path of the vehicle;

generate an overlay based on the first dynamic trajectory and the second dynamic trajectory, wherein the overlay indicates at least one risk, wherein each of the at least one risk is located within the first dynamic trajectory and the second dynamic trajectory; and apply the overlay to the visual multimedia content.

10. The system of claim 9, wherein the at least one first latency value includes an incoming latency time $t_1$, wherein the incoming latency time $t^1$ is an amount of time required to receive at least one frame at a remote operator device from a vehicle computing unit of the vehicle.

11. The system of claim 9, wherein the at least one first latency value includes an incoming latency time $t_1$ and an outgoing latency time $t_2$, wherein the incoming latency time $t_1$ is an amount of time required to receive at least one frame at a remote operator device from a vehicle computing unit of the vehicle, wherein the outgoing latency time $t_2$ is an amount of time required to send at least one frame from a remote operator device to a vehicle computing unit of the vehicle.

12. The system of claim 9, wherein each dynamic trajectory is a three-dimensional (3D) projection including a plurality of 3D points, wherein the system is further configured to:

convert each dynamic trajectory into a two-dimensional (2D) representation using a projective geometry model, each 2D representation having a plurality of 2D points, wherein each 2D representation includes an image plane pixel position of each 2D point of the 2D representation.

13. The system of claim 12, wherein the system is further configured to:

translate at least a portion of the plurality of 2D points of each 2D representation into a plurality of pixels based on the image plane pixel position of each 2D point.

14. The system of claim 13, each dynamic trajectory having a length, wherein the at least a portion of the plurality of 2D points of each 2D representation includes a sampling of the plurality of 2D points, wherein the sampling includes a number of points that is independent of the length of the respective dynamic trajectory.

15. The system of claim 9, the vehicle having a front end and a center axis, wherein each dynamic trajectory includes two arcs, each arc representing a respective angular stopping distance of the vehicle, wherein each arc begins at a point along the front end of the vehicle, wherein the two arcs are located at a predetermined distance from the center axis of the vehicle.

16. The method of claim 1, wherein the at least one reaction time used to calculate the second dynamic trajectory includes a reaction time of an operator of the vehicle, wherein the first dynamic trajectory is calculated based further on a reaction time of the vehicle, wherein the reaction time of the vehicle is the only reaction time used to calculate the first dynamic trajectory.

* * * * *